US010576847B2

(12) United States Patent
Hiemstra et al.

(10) Patent No.: US 10,576,847 B2
(45) Date of Patent: Mar. 3, 2020

(54) VEHICLE SEAT AND SEAT RECLINER ARRANGEMENT WITH RECLINER HARD LOCK TO AVOID RETURNING BACKREST IN NON-LOCKABLE TRACK REGION

(71) Applicant: Adient Luxembourg Holding S.à.r.l., Luxembourg (LU)

(72) Inventors: Bruce Hiemstra, Ann Arbor, MI (US); Yue Lang, Northville, MI (US)

(73) Assignee: Adient Luxembourg Holding S.à r.l., Luxembourg (LU)

( * ) Notice: Subject to any disclaimer, the term of this patent is extended or adjusted under 35 U.S.C. 154(b) by 123 days.

(21) Appl. No.: 15/579,329

(22) PCT Filed: Jun. 2, 2016

(86) PCT No.: PCT/US2016/035490
§ 371 (c)(1),
(2) Date: Dec. 4, 2017

(87) PCT Pub. No.: WO2016/196777
PCT Pub. Date: Dec. 8, 2016

(65) Prior Publication Data
US 2018/0215288 A1   Aug. 2, 2018

Related U.S. Application Data

(60) Provisional application No. 62/171,324, filed on Jun. 5, 2015.

(51) Int. Cl.
*B60N 2/20*   (2006.01)
*B60N 2/22*   (2006.01)
(Continued)

(52) U.S. Cl.
CPC .............. *B60N 2/20* (2013.01); *B60N 2/06* (2013.01); *B60N 2/123* (2013.01); *B60N 2/16* (2013.01); *B60N 2/22* (2013.01); *B60N 2/3011* (2013.01)

(58) Field of Classification Search
CPC . B60N 2/20; B60N 2/06; B60N 2/123; B60N 2/16; B60N 2/22; B60N 2/3011
(Continued)

(56) References Cited

U.S. PATENT DOCUMENTS 5,695,247 A    12/1997  Premji
5,788,330 A    8/1998   Ryan
(Continued)

FOREIGN PATENT DOCUMENTS

DE    102004002728 B2    4/2005
DE    102012010238 A1    12/2012
WO    2011063521 A1      6/2011

*Primary Examiner* — Mark R Wendell
(74) *Attorney, Agent, or Firm* — Marshall & Melhorn, LLC

(57) ABSTRACT

A vehicle seat includes a seat base, a backrest and a track arrangement with a fixed track part and a moveable track part and with a lockable range to lock the seat and the moveable track part relative to the a fixed track part. A lockout mechanism locks the backrest in a forward position with the seat base in a non-lockable track range. The lockout mechanism includes a lockout catch member connected to the backrest and a lockout hook connected to the seat base, which is pivotable between a locked position, with the lockout hook engaging the lockout catch member, and an unlocked position. A blocker member is connected to the seat base and is pivotable between a blocking position, with the blocker engaging the lockout hook to maintain the lockout hook in the locked position and an open position, with the blocker not engaging the lockout hook.

16 Claims, 9 Drawing Sheets

(51) Int. Cl.
  *B60N 2/12* (2006.01)
  *B60N 2/16* (2006.01)
  *B60N 2/06* (2006.01)
  *B60N 2/30* (2006.01)

(58) Field of Classification Search
  USPC .................................................. 297/344.1
  See application file for complete search history.

(56) References Cited

U.S. PATENT DOCUMENTS

| | | | |
|---|---|---|---|
| 5,944,383 A * | 8/1999 | Mathey | B60N 2/123 |
| | | | 248/429 |
| 2005/0156455 A1 | 7/2005 | Deptolla | |
| 2009/0108658 A1 | 4/2009 | Muller et al. | |
| 2012/0223561 A1 | 9/2012 | Hurst, III et al. | |
| 2013/0057043 A1* | 3/2013 | Ngiau | B60N 2/123 |
| | | | 297/378.1 |

* cited by examiner

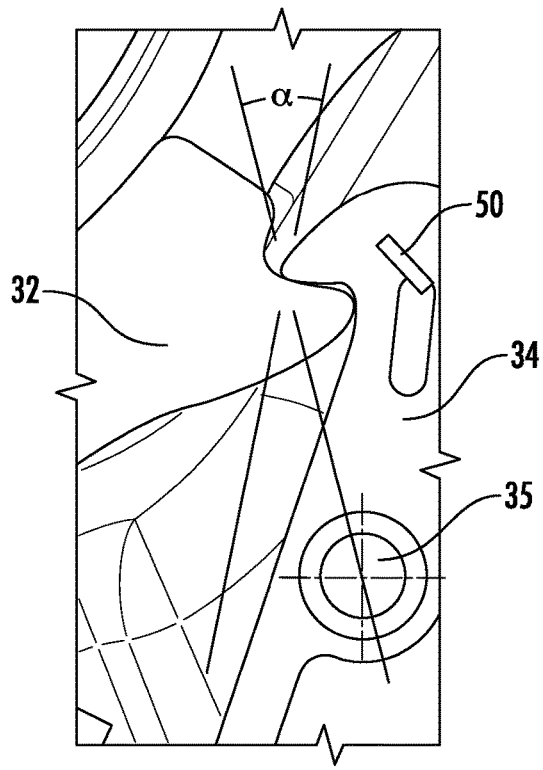 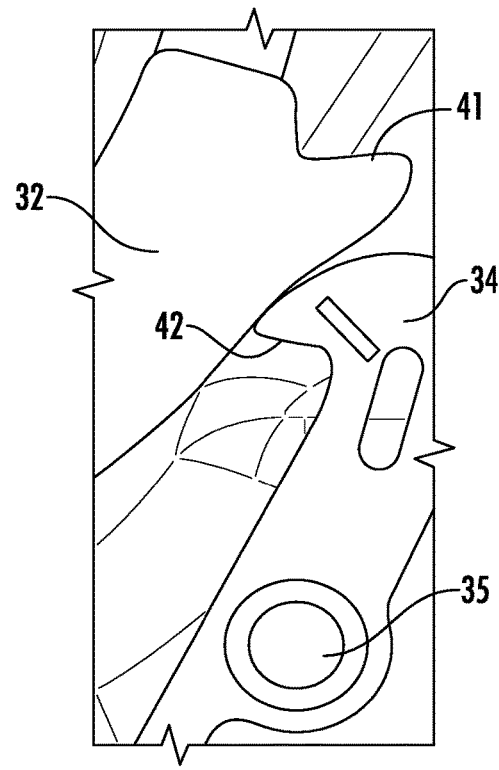
FIG. 7A  FIG. 7B
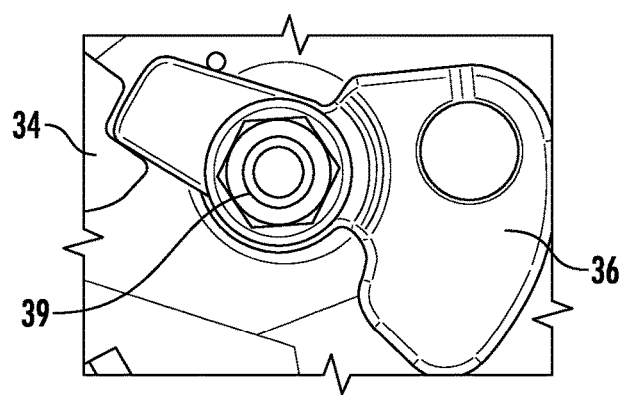 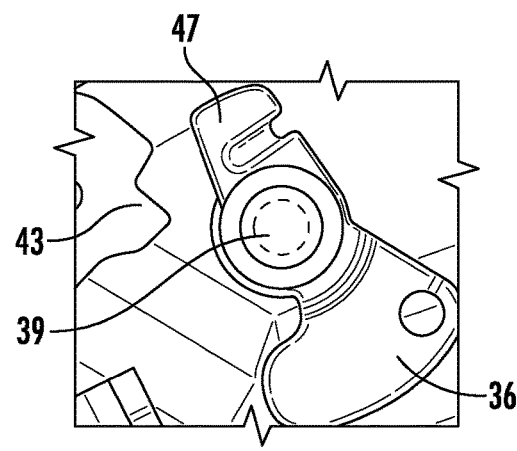
FIG. 8A  FIG. 8B

VEHICLE SEAT AND SEAT RECLINER ARRANGEMENT WITH RECLINER HARD LOCK TO AVOID RETURNING BACKREST IN NON-LOCKABLE TRACK REGION

CROSS REFERENCE TO RELATED APPLICATIONS

This application is a United States National Phase Application of International Application PCT/US16/35490, filed Jun. 2, 2016, and claims the benefit of priority under 35 U.S.C. § 119 of U.S. Provisional Application U.S. 62/171,324, filed Jun. 5, 2015 the entire contents of which are incorporated herein by reference.

FIELD OF THE INVENTION

The present invention relates to vehicle seats and more particularly to a vehicle seat that is moveable along a track for position adjustment and rear entry and which includes a recliner (backrest) that can be rotated forward in a non-driveable position for rear entry and which can be hard locked in the forward position with the seat base (cushion) in a non-lockable (forward) track region.

BACKGROUND OF THE INVENTION

Vehicle seats are provided with a recliner feature, allowing the backrest to be repositioned relative to the seat base (cushion). Such vehicle seats may also be mounted to the vehicle floor via a track arrangement. The track arrangement can allow adjustment of the longitudinal position of the vehicle seat, to accommodate different drivers (comfort adjust). The recliner feature can also be used as part of an easy entry feature in which the backrest pivots forward and the seat base moves along the track to a forward position, allowing a passenger to enter into a rear seat. Using the easy entry feature, with the vehicle seat in any forward position along the track, it is disadvantageous for the backrest to be pivoted back to a use position (essentially upright position), as the vehicle seat base is not in a use position.

SUMMARY OF THE INVENTION

A vehicle seat is advantageously provided with a recliner arrangement and a track arrangement that provides an easy entry function with a lockout system that prevents the user from returning the backrest (seat back) to a driveable position (a normal use position) with the vehicle seat in a forward non-lockable track region.

According to the invention, a vehicle seat is provided comprising a track arrangement comprising a fixed track part and a moveable track part. The track arrangement has a lockable range or locking range (locking region). A seat base is connected to the moveable track part for movement relative to the fixed track part. The moveable track part is lockable relative to the fixed track part in one of a plurality of locking positions in the lockable range. A lever recliner fitting pivotably connects a backrest to the seat base. The lever recliner fitting releases the backrest from a set position, allowing pivoting of the backrest and adjustment of an inclination to a new set position of the backrest relative to the seat base. A release element and pivot latch release are provided for releasing the backrest for pivoting into a forward position—easy entry function. The forward pivoting also releases a locking state between the seat base and the track, allowing the seat base and the backrest in the forward position, to move forward to a non-lockable track range (non-locking region). A lockout mechanism is provided locking the backrest in the forward position with the seat base in the non-lockable track region and releasing the backrest from the forward position, for movement to upon moving the seat base rearward to the lockable range The lockout mechanism comprises a lockout catch member connected to one of the backrest and the seat base and a lockout hook connected to another of the backrest and seat base. For example, the lockout catch member may be connected to the backrest and the lockout hook may be connected to the seat base. The lockout hook may pivot between a locked position, with the lockout hook engaging the lockout catch member, and an unlocked position. The lockout mechanism further comprises a blocker member connected to the seat base and pivotable between a blocking (closed) position and a non-blocking (open) position. In the closed position the blocker engages the lockout hook to maintain the lockout hook in the locked position. In the open position the blocker does not engage the lockout hook, whereby the locker hook can be backdriven into the unlocked position. The lockout mechanism may use a spring, biasing the blocker member into a blocking position, blocking the lockout hook from moving from the locked position to the unlocked position.

The track arrangement preferably comprises a comfort adjust actuator bar to release the moveable track part relative to the fixed track part for movement within the track lockable range and to set a seat position of the moveable track part relative to the fixed track part within the track lockable range. The vehicle seat has the easy entry function in which the backrest is pivoted (dumped) forward relative to the seat base. With this, the seat base and the backrest are moveable into a non-lockable range along the fixed track. A cable device may be used for moving the blocker member from the blocking position to the open position. The cable device may be responsive to a position of the seat base and backrest along the track. The plurality of locking positions of the track are along the lockable range. The cable device moves the blocker member from the blocking position to the open position as the seat base and backrest are moved out of the non-lockable range into the lockable range.

The vehicle seat may include a memory device indicating a set position of the moveable track part relative to the fixed track part in the lockable range. A state of the cable device may change upon the vehicle seat and moveable track passing relative to the indicated set position of the memory device. The change in state of the cable actuates a movement of the blocker member from the open position to the blocking position based on passing the memory device. A change in state occurs upon the vehicle seat and moveable track passing in a direction relative to the indicated set position. Upon moving toward the non-lockable range and upon returning from the non-lockable range, the state change in the cable causes the blocker member to pivot from the blocking position to the open position. The state change that results in the blocker member being in the blocking position or the open position is at least a function of the track being in the non-lockable range but may more advantageously be a function of the track being on a non-lockable range side of the memory device.

The lockout hook is advantageously back driveable from a locked position by moving the backrest, particularly by moving the lockout catch member that is connected to one of the backrest and the seat base. The lockout hook can be moved out of the locking position with the blocker member not in the blocking position. With the movement of the catch member, the lockout hook is moved out of the locked position to the unlocked position with the blocker member in the open position. The lockout hook is only maintained in the locked position by the blocking action of the blocker member in the closed (blocking) position.

The lockout hook and the blocker member may advantageously be configured to be unhanded—to be used on either a left side or a right side of a vehicle seat. In particular, the vehicle seat may be one the left side of the vehicle—such as a drivers seat for driving on the right side of the road. In this case the lever recliner fitting is on the left side of the vehicle seat—the outboard side of the vehicle seat—and the opposite fitting is on the right side of the vehicle seat—the inboard side of the vehicle seat. This allows actuation of the fitting driver by the lever at the outboard side of the vehicle seat. If the vehicle seat is used at the opposite side of the vehicle (the right side of the vehicle) position of the fittings is changed. The lockout hook and the blocker member may be provided on the right side of the vehicle seat. With the unhanded configuration of the lockout hook and the blocker member, the same parts may be used for a vehicle seat on the left side or on the right side of the vehicle.

According to another aspect of the invention, a recliner arrangement is provided for a vehicle seat having a backrest and a seat base connected to a vehicle floor by a track arrangement comprising a fixed track part and a moveable track part, wherein the track arrangement has a lockable range and a non-lockable track range. The recliner arrangement comprises a seat base part and a backrest part. A lever recliner fitting comprises a seat base fitting part connected to the seat base part and a backrest fitting part connected to the backrest part. The seat base fitting part is pivotably connected to the backrest fitting part for setting an inclination of the backrest part relative to the seat base part, in a set position, and allowing pivoting movement of the backrest relative to the seat base to adjust an inclination to a new set position of the backrest part relative to the seat base part. A pivot latch release realizable connects the backrest part to the backrest fitting part for pivotally releasing the backrest part from the backrest fitting part upon actuation of a release mechanism for pivoting the backrest part into a forward position relative to the seat base part. A lockout mechanism locks the backrest part in the forward position, with the seat base part in the non-lockable track range and releases the backrest from the forward position with the seat base part in the lockable range.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 7A is a detail view of a lockout catch plate and a lockout hook, showing the locked position with the lockout catch plate engaged by the lockout hook;

FIG. 7B is a detail view according to FIG. 7A of the lockout catch plate and the lockout hook showing the normal comfort adjust position with the lockout catch not engaged by the lockout hook;

FIG. 8A is a detail view of a blocker and a portion of the lockout hook, showing the blocker in a closed position, blocking the lockout hook with the lockout hook in the locked position;

FIG. 8B is a detail view of the blocker and a portion of the lockout hook, showing the blocker in an open position allowing the back driven lockout hook to occupy a position not blocking the lockout hook allowing the lockout hook to move out of the locked position;

DESCRIPTION OF THE PREFERRED EMBODIMENTS

Figure 1:
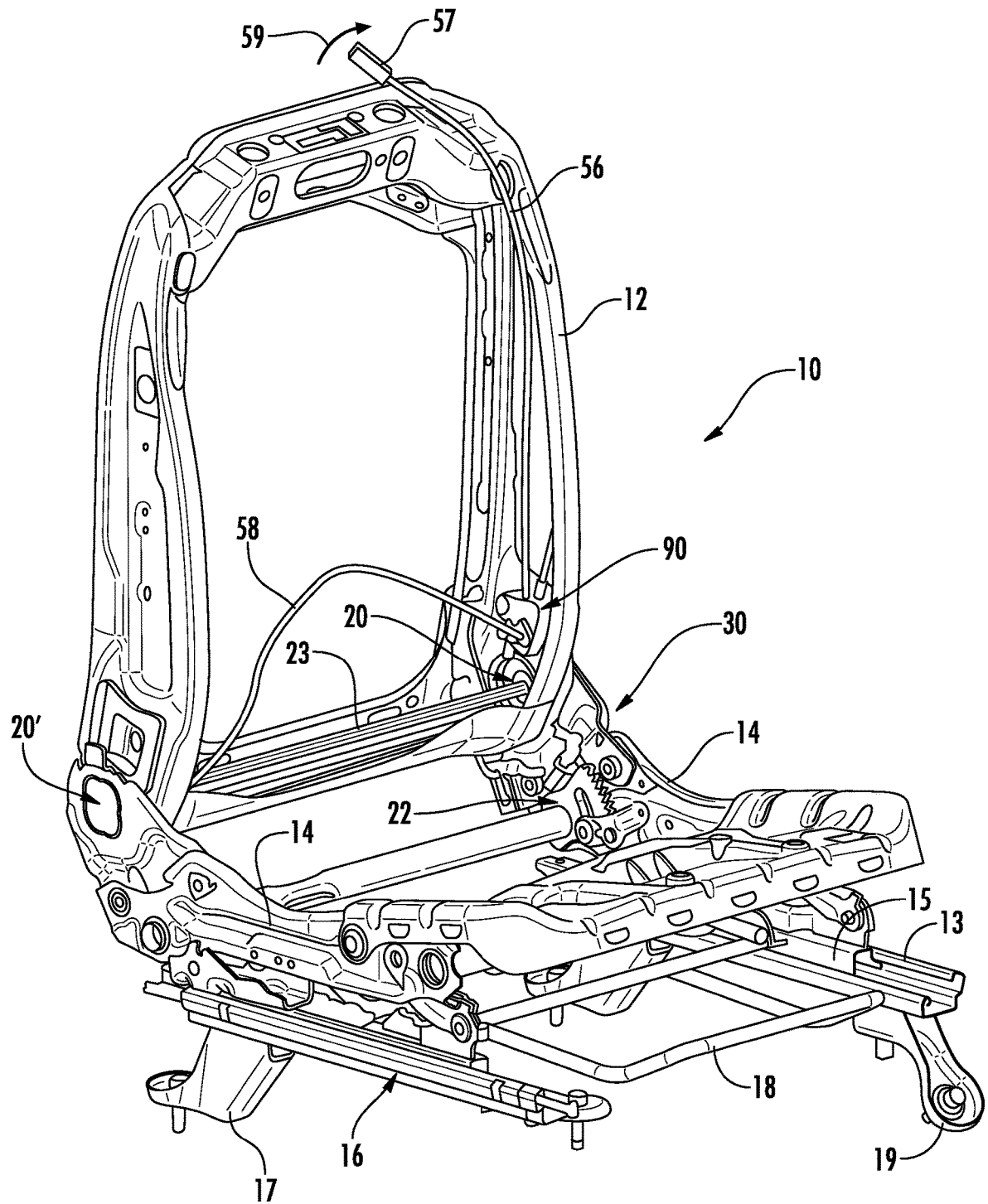
FIG. 1 is a perspective partially schematic view showing components of the vehicle seat according to the invention.
Figure 4:
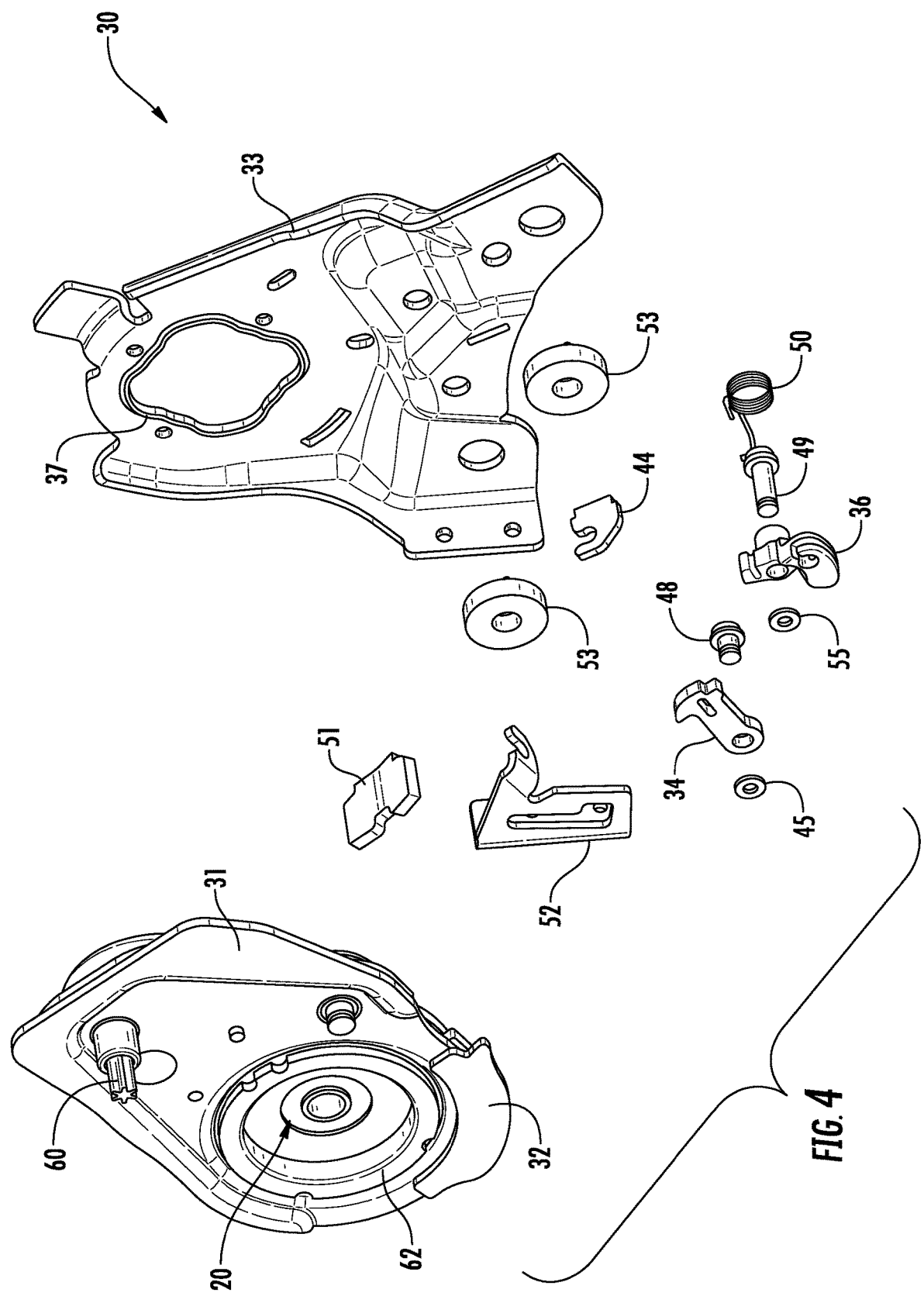
FIG. 4 is an exploded view of the recliner arrangement.

Referring to the drawings, FIG. 1 shows a vehicle seat generally designated 10. The vehicle seat 10 includes a backrest structure 12 which is pivotably connected to a seat base structure 14. The connection between the backrest structure 12 and the seat base structure 14 is by recliner connections at each side of the backrest 12. The recliner connections include a recliner arrangement 30 with a recliner fitting generally designated 20 at an outboard side and a recliner fitting generally designated 20' at an opposite inboard side. The recliner fittings include a fitting part connected to the backrest 12 and a fitting part connected to the seat base 14 and may be actuated to provide a comfort adjustment of the backrest 12 by a pivoting movement of the backrest about a fitting pivot axis. The comfort adjustment allows an angle of the backrest 12 to be adjusted relative to the seat base 14, to change an backrest inclination from an initial set position of the backrest 12 to an adjusted set position of the backrest 12. The recliner fitting 20 is a lever recliner fitting. A backrest fitting part is welded to a latch pivot 62 that is normally connected to the backrest bracket part 31 of the backrest 12. A seat base fitting part is fixed to a seat base bracket 33 of the seat base 14 (FIG. 4). A lever (not shown) as an actuator is moved about a lever axis to release the backrest 12 from the set position for a pivoting movement of the backrest 12 relative to the seat base 14.

The recliner fitting 20 includes a driver 21 (FIG. 2) connected to the lever, for actuating the recliner fitting 20, to allow movement of the backrest fitting part relative to the seat base fitting part and to allow the backrest 12 to pivot relative to the seat base 14. The recliner fitting 20 is linked with a cross shaft 23 (FIG. 1) to actuate a portion of the inboard recliner fitting 20' at the other side (at the inboard side). The lever and the recliner fittings 20 and 20' are normally locked (set), with backrest fitting parts and seat base fitting parts fixed relative to each other, which maintains the backrest 12 in the set position. Upon actuation with the lever, the driver 21 is rotated by the lever and the recliner fitting 20 at the outboard side is unlocked and the recliner fitting 20' at the inboard side is unlocked, via cross shaft 23. The unlocking of the two fittings 20 and 20' allows the backrest fitting parts and seat base fitting parts to rotate relative to each other. With the recliner fitting 20 and the recliner fitting 20' in the unlocked state the comfort adjustment of the backrest is possible, allowing the backrest 12 to pivot relative to the seat base 14 and to be set in a desired angular set position.

Figure 2:
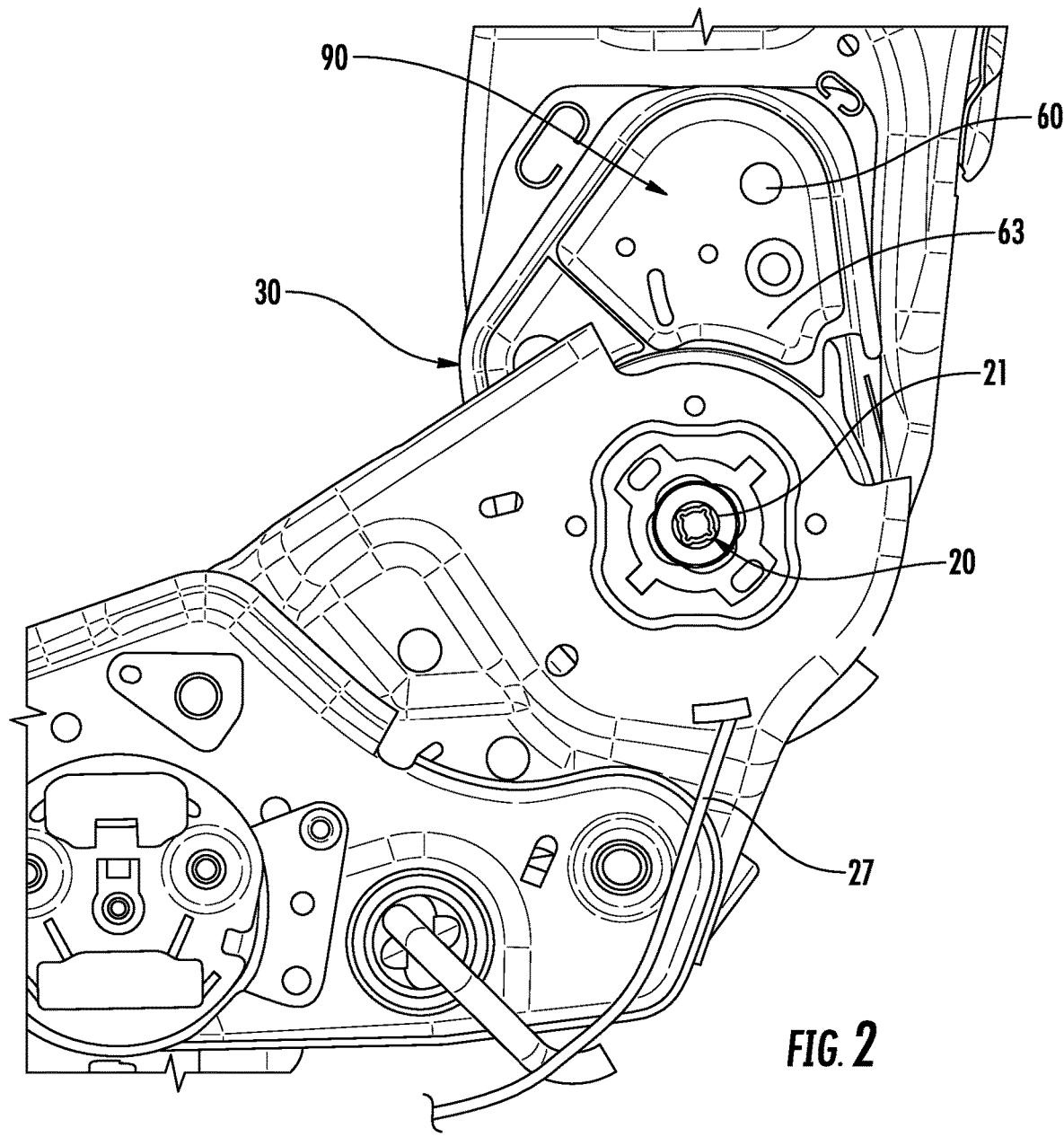
FIG. 2 is a side view showing a portion of a backrest and a recliner arrangement with a functional connection to a seat base of the vehicle seat according to FIG. 1.
Figure 3A:
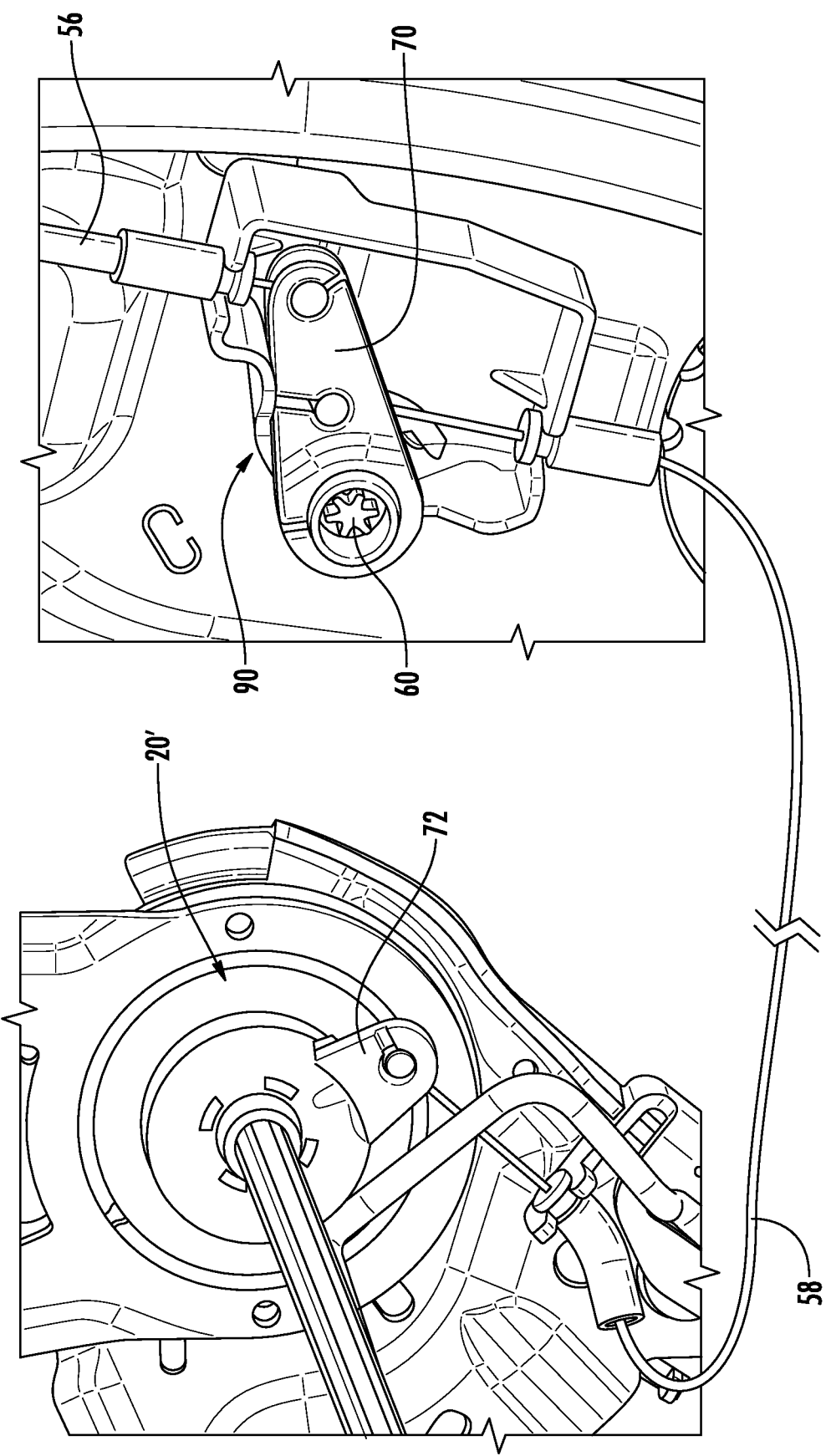
FIG. 3A is broken away view with a schematic connecting cable arrangement showing on the right a pivot latch release (at a vehicle seat outboard side) and showing on the left a lever release (at an opposite inboard side) in the easy entry actuated state.
Figure 3B:
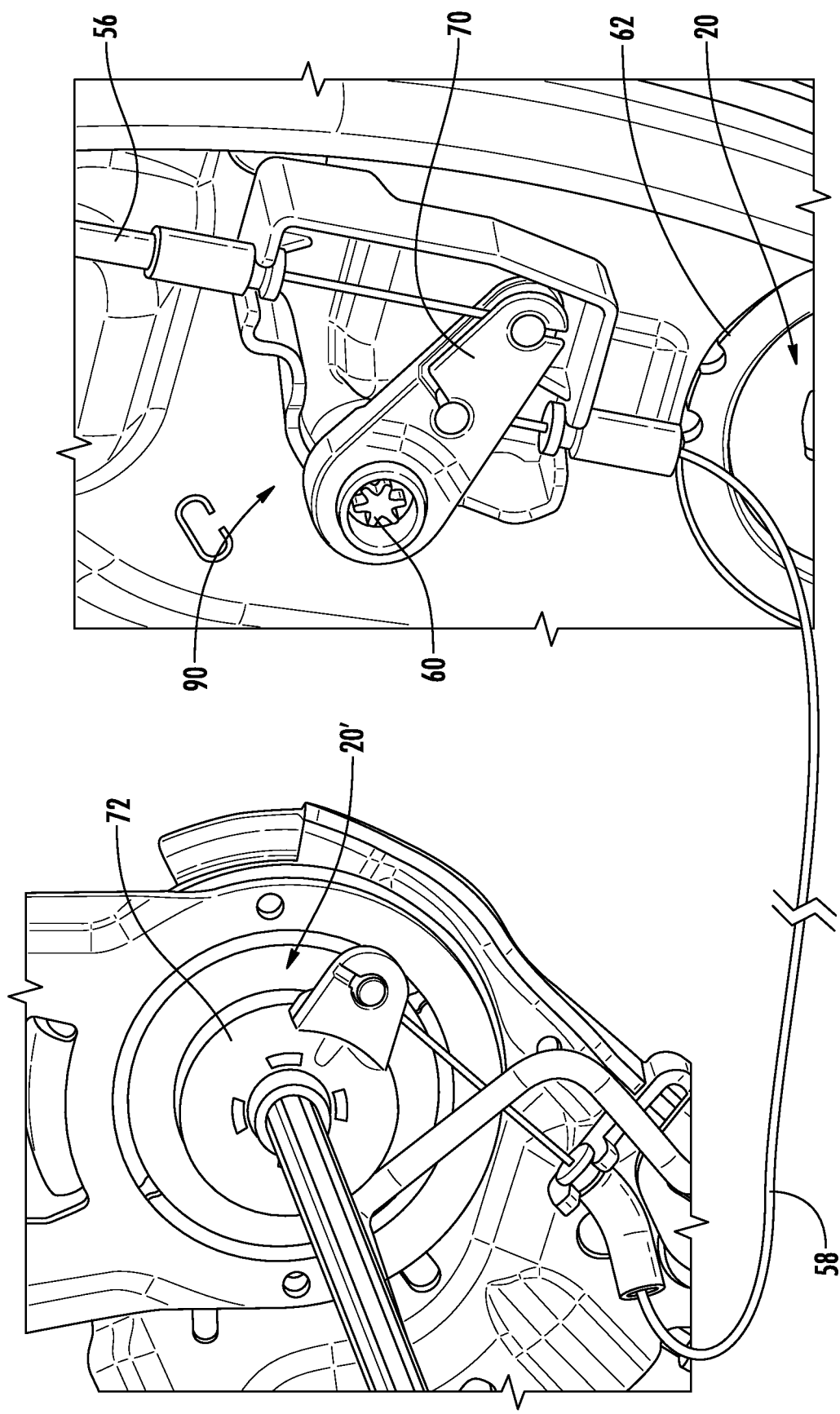
FIG. 3B is a broken away view according to FIG. 3A showing on the right the pivot latch release (at the outboard side) and showing on the left the lever release (at the opposite inboard side) in the easy entry locked state and schematically showing the connecting cable arrangement.

The vehicle seat 10 also has an easy entry function in which the backrest 12 is pivoted (dumped) forward relative to the seat base 14. The backrest 12 supports an easy entry release element 57 (shown schematically in FIG. 1). The release element 57 is connected by a cable arrangement 56 to a pivot latch release arrangement 90. The pivot latch release arrangement 90 includes a lever 70 of a latch pivot region 63 (FIGS. 2, 3A and 3B). The recliner bracket 31, of the backrest 12, has a latch pivot opening receiving the latch pivot 62 (FIG. 4). The latch pivot 62 is welded to the backrest fitting part of fitting 20 and is rotatable relative to the recliner bracket 31. Normally, the latch pivot 62 is latched to the recliner bracket 31 of the backrest 12, via the pivot latch release arrangement 90, so the backrest fitting part of fitting 20, the latch pivot 62, the recliner 31 and backrest 12 all move together and there is no relative movement. With a pivoting of the release element 57 in the direction 59, the pivot release lever 70 pivots, causing a latch release shaft 60 to rotate. The rotation of the latch release shaft 60 releases the latch pivot 62 from a latch in the latch pivot region 63 (see FIGS. 2 and 4) of pivot latch release arrangement 90. As the latch pivot 62 is welded to the backrest part of the fitting 20, upon the release, the backrest 12 pivots relative to the latch pivot 62, about the pivot axis without movement of the fitting parts that form fitting 20. As such the backrest connected parts and the seat base connected parts of fitting 20 remain in position—a memory position. As such, a return of the backrest 12 to an upright state from the forward (dumped) position returns the backrest 12 to the previously set position. The backrest and seat base connected parts of the fitting 20 have not moved relative to each other. The pivot release lever 70 is connected to a cable arrangement 58, to rotate a lever release 72, at the inboard side. The rotation of the lever release 72 releases the inboard side recliner fitting 20' (which does not have a memory feature). With the inboard recliner fitting 20' and the outboard side latch pivot 62 released, the backrest 12 may be dumped forward for easy entry into a seating region behind the vehicle seat 10. This forward pivoting of backrest 12 relative to the seat base 14 occurs with the outboard recliner fitting 20 locked (set) in position, thereby providing a memory function. This allows the backrest 12 to be returned to the original angular set position, based on the comfort adjustment position set.

The vehicle seat 10 also includes a track arrangement 16, connected to the vehicle by the supports 17 and 19. The track arrangement 16 includes moveable track parts 15, connected to the seat base parts 14 and backrest 12. The track parts 15 can be moved along fixed track parts 13, that are fixed to the vehicle. The track arrangement 16 includes a comfort adjust or lockable range (region), allowing a position adjustment of the vehicle seat 10 in a longitudinal direction. This provides a locking of the seat track parts 15 in a position along the track lockable range (region) of track parts 13. The track arrangement 16 also has a non-lockable range forward of the lockable range. The vehicle seat 10 occupies the non-lockable range to provide the easy entry function.

Figure 5:
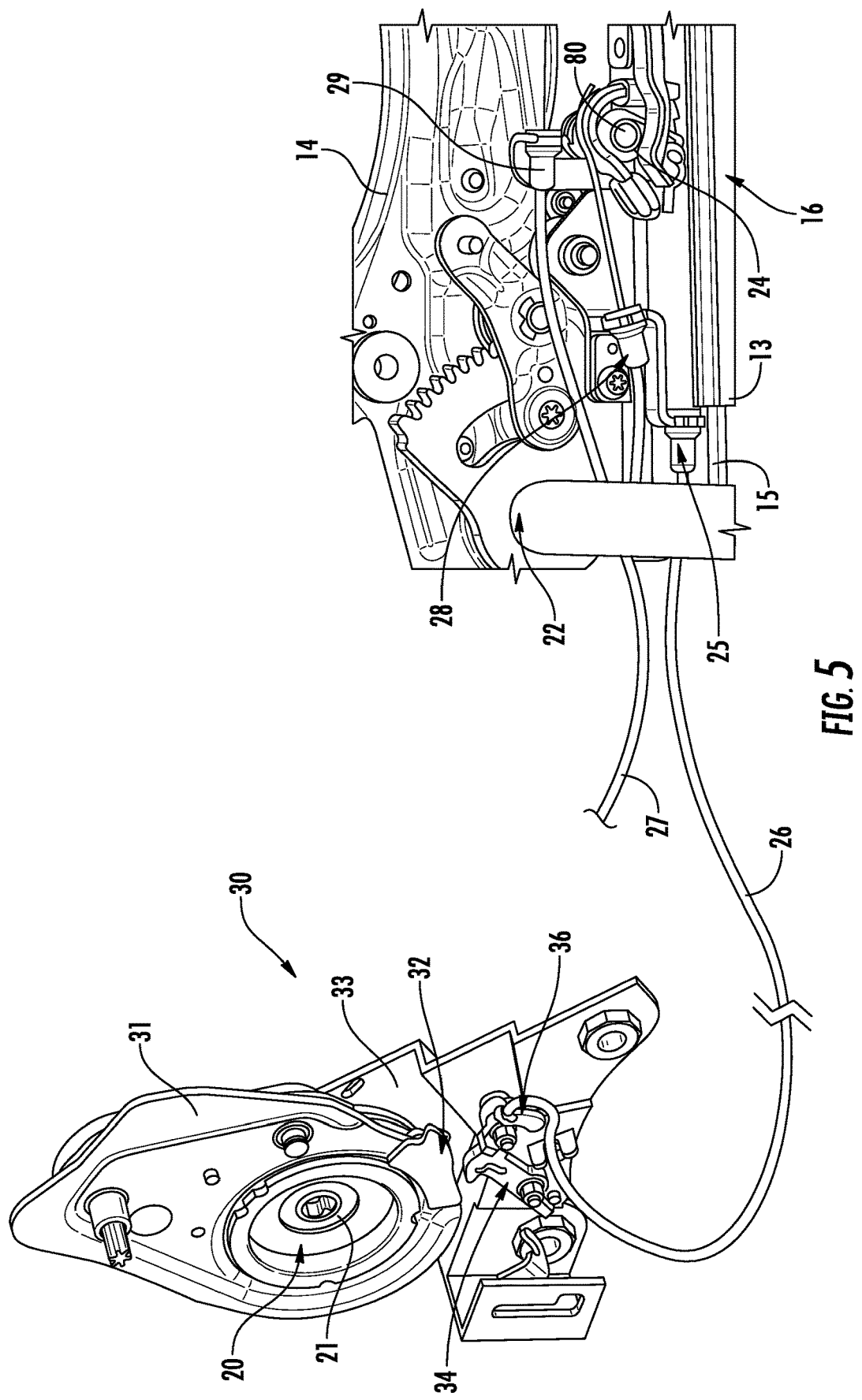
FIG. 5 is a perspective view showing a recliner arrangement (on the left) with a schematically shown functional connection to a seat base and track arrangement (on the right) of the vehicle seat according to FIG. 1.

A comfort adjust bar 18 can be pivoted to adjust the comfort position of the vehicle seat 10. The comfort adjust bar 18 releases the locking feature of the track arrangement 16, to release the upper track 15 from the lower track 13 for movement. This allows the vehicle seat 10 to move with the movement of seat track parts 15 relative to fixed track parts 13 of the track arrangement 16 (see FIG. 5). The comfort adjustment is provided with the comfort adjust bar 18, causing the cable arrangement (Bowden cable arrangement) 29 to release a locking state, to allow an adjustment of the position of the vehicle seat 10 over an adjustment range (a track lockable range) to set the position of the seat 10 in the track lockable range (within a range delimited in part by a forward stop). Upon selecting the appropriate position of the vehicle seat 10, the comfort adjust bar 18 is released and the seat position in the longitudinal direction is set to a set position.

The vehicle seat 10 also include a height adjust arrangement 22, to adjust the height of the vehicle seat 10 relative to the track arrangement 16.

Figure 6:
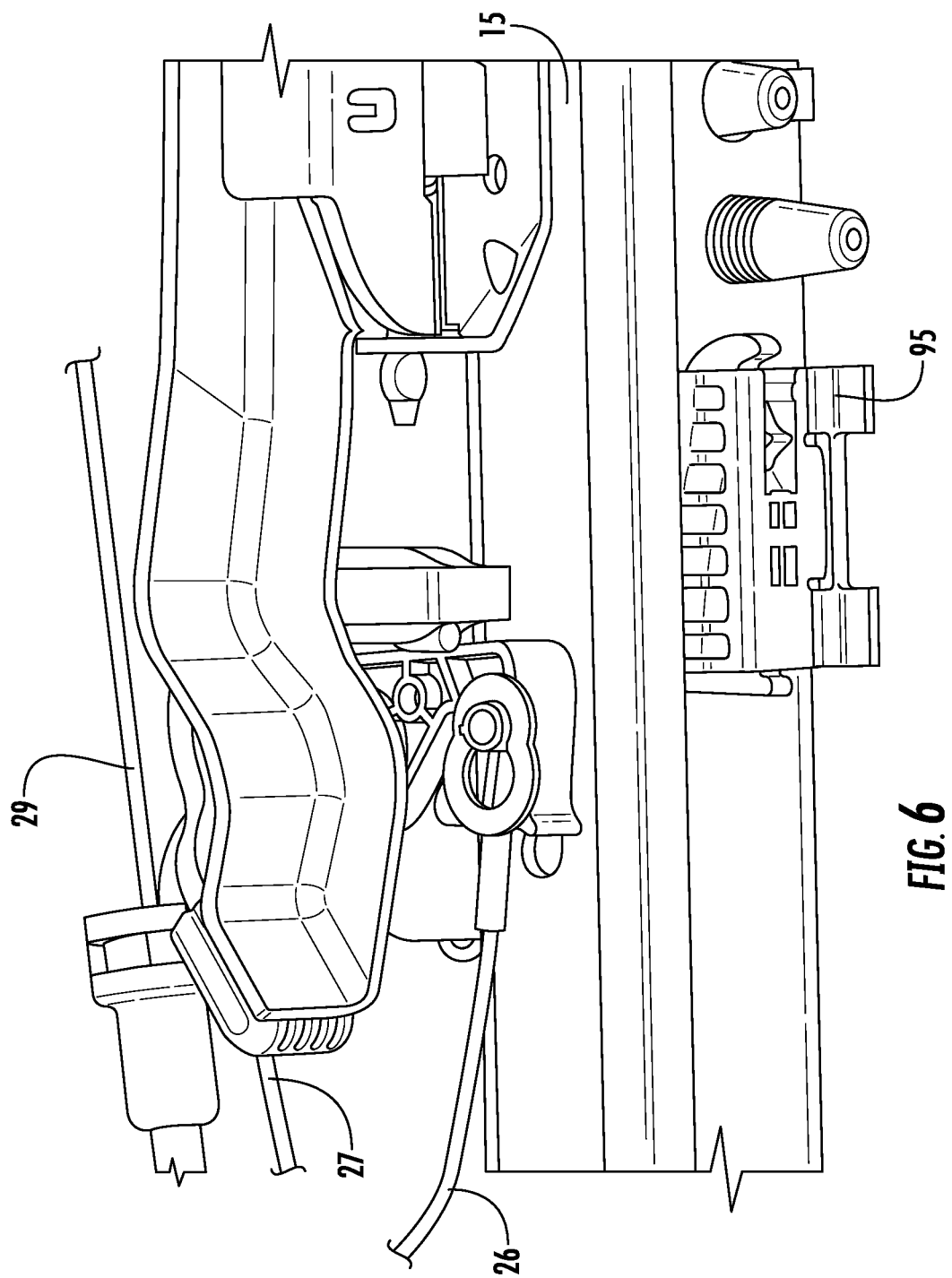
FIG. 6 is a lower perspective view showing the upper track and memory stone with the lower track removed.

The seat 10 can also be moved along the track arrangement 16 with the easy entry function. Upon actuation of the easy entry release element 57, the forward pivoting of backrest 12 relative to the seat base 14 is accompanied by a changes in a state of a cable arrangement that includes a cable 27 (see FIGS. 2, 5 and 6). The backrest forward rotation pulls cable 27 and opens the lock state of the track 16. The cable 27 is connected to a track release 28 to release a locking feature, to release the upper track 15 from the lower track 13, for movement of the upper track 15 and to allow the upper track 15 to move beyond the forward stop so that the upper track 15 can move into the forward unlockable range for easy entry.

The comfort adjustment is associated with a range of locking positions that define the track lockable range. The range of lockable positions of the seat 10 along the track arrangement 16, for the comfort adjustment, does not extend to a portion of the lower track 13 for the easy entry function. In a region of movement of the seat track part 15 relative to the fixed track parts 13 for the easy entry function, the seat 10 can be positioned into the non-locking track region. The features that provide the easy entry function include a memory device (memory stone arrangement) 24 that indicates the comfort adjust set position along the fixed track 13. With a pivoting of release element 57 in the direction 59, the memory device 24 drops a memory stone (a memory indicator) 95, indicating the comfort adjust set position (FIG. 6) along the fixed track 13. The seat 10 and the track parts 15 move relative to fixed track parts 13 into the non-locking track region. A cable actuator, that shares a pivot 80, changes state (position/attitude/inclination) upon passing over the memory stone ramp surface. With this a blocker cable 26 is actuated (slackened) as track 15 leaves the memory stone 95 behind. The actuator at pivot 80 is connected to a cable arrangement 25 and to the cable 26 (see FIGS. 5 and 6). The movement of the actuator at pivot 80 changes a state of the cable 26, such that the cable 26 becomes slack. Upon a return of the seat 10 and the track parts 15 along fixed track parts 13 into the locking track region, the actuator at pivot 80 again changes position upon passing over the memory stone 95. The actuator at pivot 80 returns to an original position, changing a state of a cable arrangement 25, such that the cable 26 becomes taut. The vehicle seat 10 and the track parts 15 can return to the original position along the track 13, set via the comfort adjust bar 18, by returning to the location of a memory stone dropped by the memory device 24.

The recliner arrangement 30 includes the bracket part 31 fixed to the backrest 12. The bracket 31 is rotationally connected to the recliner fitting 20. The recliner fitting 20 is also fixedly connected to a bracket 33, which is connected to the seat base part 14. The actuation of the recliner fitting 20 (via a comfort adjust actuator lever that acts on the driver 21) allows a controlled pivoting of the bracket 31, with connected backrest 12, relative to the bracket 33, and relative to the seat base part 14 for a comfort adjust movement of the backrest 12. The actuation of latch release shaft 60 releases the latch pivot 62, in latch pivot region 63 (see FIG. 4) and releases the inboard recliner fitting 20' to allow the backrest 12 to be pivoted (dumped) forward, pivoting the bracket 31, with connected backrest 12, relative to the bracket 33, and relative to the seat base part 14.

The recliner arrangement 30 is connected to parts of a lockout mechanism, including a lockout catch plate 32, fixed on the bracket 31. The lockout catch plate 32 has an upper engagement surface. A lockout hook 34 is pivotally mounted to bracket 33 and a blocker 36 is pivotally mounted to the bracket 33. The lockout hook 34 has a hook surface 42 and a block surface 43. The blocker 36 has a blocking surface 47. FIG. 4 shows an exploded view of the recliner arrangement 30, including the bracket 33 with a fitting receiving opening 37 and the recliner bracket 31. A stop bracket 51 is connected to the recliner bracket 33. The recliner arrangement 30 also includes a stepped pin 48 and washer 45, pivotably mounting the lockout hook 34, to allow pivoting about a pivot axis. The blocker 36 is pivotably mounted to the bracket 33 via stepped pin 49 and washer 55. The blocker 36 cooperates with a coil spring 50 to bias the blocker 36 to a blocking position (see FIG. 8A). The lockout hook 34 also cooperates with the coil spring 50. The coil spring 50 engages the central slot of the lockout hook 34. The configuration with blocker 36, coil spring 50 and lockout hook 34 biases the lockout hook 34 toward a locking position (see FIG. 7A). In the alternative, the blocker 36 and the lockout hook 34 may each have separate biasing springs. The bracket 33 is connected to the seat base part 14 via bolts with weld nuts 53. The recliner arrangement 30 also includes a cable attachment bracket 44 and a cable and torsion spring attachment 52.

As the vehicle seat 10 travels into the easy entry portion (non-lockable range) of the track arrangement 16, the blocker 36 has been moved to the blocking position (FIG. 8A) blocking the hook 34 into the locked position. FIG. 7A shows the hook 34 in the locked position to prevent the backrest 12 returning to the set upright position. As the vehicle seat 10 returns to the memory position (at the memory stone 95), in the lockable range of the track arrangement 16, from the easy entry portion of the track arrangement 16, the blocker 36 is moved out of the blocking position via the cable 26 going back to a taut state. The blocker 36 is in an open position (see FIG. 8B), allowing the hook 34 to be backdriven out of the locked position into a position (see FIG. 7B) that allows the recliner arrangement to return to a position based on the comfort adjust set angular position of the backrest 12.

Although the lockout hook 34 is biased toward the locking position, the lockout hook 34 is back driveable in that it will move out of the locking position by a movement of the lockout catch plate 32 relative to the lockout hook 34. The backdriven feature is based on an approximately 25° lock angle α of the lockout hook 34 and the catch plate 32 (FIG. 7A). Self locking occurs at approximately 5.7° or less (assuming a coefficient of friction of 0.1), such that at an angle above 5.7°, the lockout hook 34 moves backward (away from the lockout catch plate 32). As such, the locking position (see FIG. 7A) comes about only with the blocker 36 is in a closed position (in the blocking position), which results in a blocking of the lockout hook 34 with a 0° lock angle. With the blocking of the hook 34, with the blocker 36, the hook 34 cannot move out of the locked position. This back driveable arrangement allows for a reduction of force of 3 to 1 between the lockout catch plate 32 and the lockout hook 34 as compared to the blocker 36 and the lockout hook 34 at the contact interfaces (see FIGS. 7A and 8A). This force reduction is advantageous as the arrangement is less sensitive to manufacturing tolerances and provides more consistent performance during use.

The blocker 36 is biased by coil spring 50 into a blocking position (see FIG. 8A) but is normally held open by the cable arrangement 28, with the cable 26 taut. When the cable 26 goes slack (upon the seat 10 passing relative to a position corresponding to the deposited memory stone 95, in a direction toward the track non-lockable range), the blocker 36 pivots at pivot 39, under the bias force of the spring 50, to move to the blocking position (see FIG. 8A). When the backrest 12 is moved forward, the backrest is locked in the forward dumped position. When the cable 26 returns to the taut state (upon the seat 10 moving relative to a position corresponding to the deposited memory stone 95, in a direction toward the track lockable range), the blocker 36 pivots at pivot 39 to move to the open position or non-blocking position (see FIG. 8B). With the lockout hook 34 no longer blocked by blocker 36, the lockout hook 34 will be back driven by a movement of the catch plate 32. The lockout hook 34 pivots at pivot 35 to the unlocked position (see FIG. 7B), allowing the backrest 12 to return to an upright position.

Figure 9B:
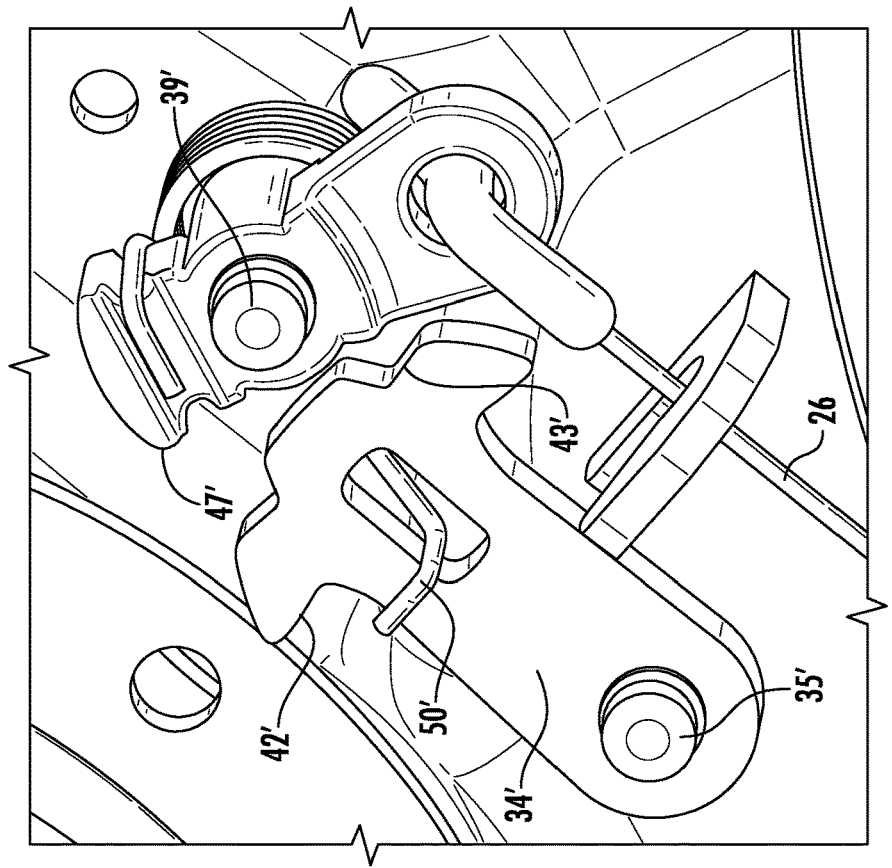
FIG. 9B is a detail view of the blocker and a portion of the lockout hook according to FIG. 9A with lock washers removed for better visibility, showing the blocker in an open position allowing the back driveable lockout hook to occupy a position not blocking the lockout hook.
Figure 9A:
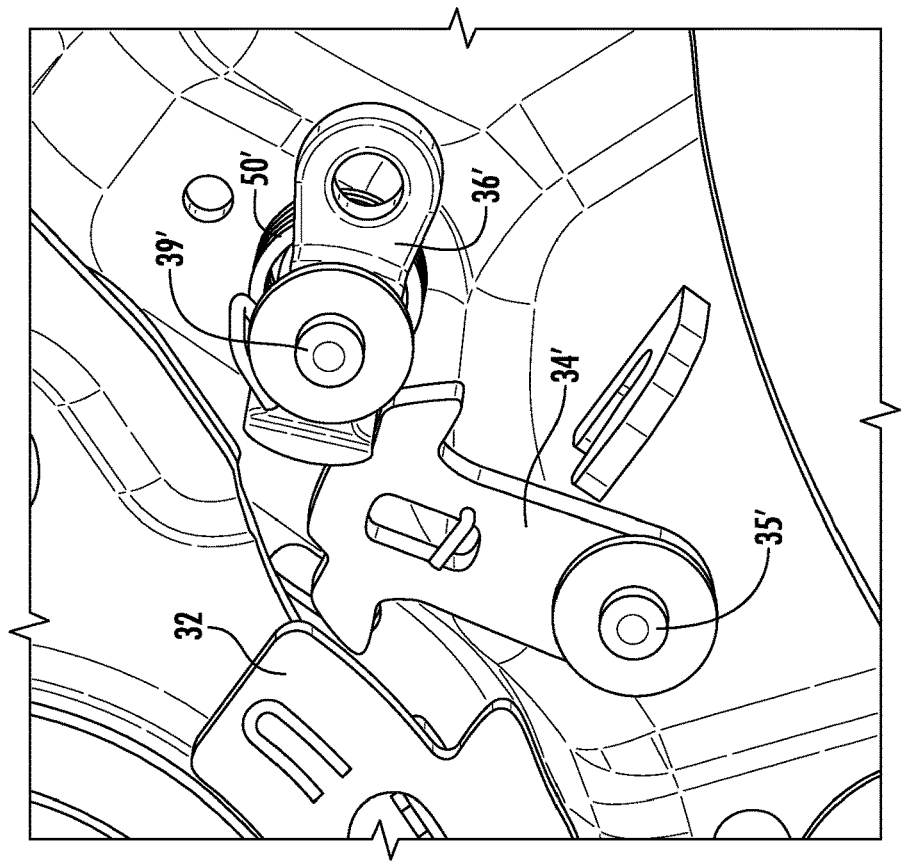
FIG. 9A is a detail view of a blocker and a portion of the lockout hook according to an alternative embodiment, showing the blocker in a closed position.

FIGS. 9A and 9B show an alternative embodiment with a lockout hook 34' and a blocker 36' that have a modified configuration. This embodiment differs from what is shown in FIGS. 8A and 8B in that the arrangement is unhanded—it may be used on either a left side or a right side of a vehicle seat 10. In particular, the embodiment of FIG. 1 may be a drivers seat for driving on the right side of the road. In this case the lever recliner fitting 20 is on the left side of the vehicle seat 10—the outboard side of the vehicle seat 10—and the fitting 20' is on the right side of the vehicle seat—the inboard side of the vehicle seat 10. This allows actuation of the driver 21 by the lever at the outboard side of the vehicle seat 10. If the vehicle seat 10 is a passenger side seat (or a driver seat for driving on the left side of the road), the fitting 20 is on the right side of the vehicle seat 10—again the outboard side of the vehicle seat 10—and the fitting 20' is on the right side of the vehicle seat the outboard side of the vehicle seat 10. To allow the use of the use of the lockout hook 34' and a blocker 36' on either a left side or a right side of the vehicle seat 10, the lockout hook 34' has a hook surface 42' and a block surface 43' on each side. The blocker 36' has a blocking surface 47' on each side and a recess is provide for receiving an end of the coil spring 50' for mounting on the left side or the right side of the vehicle seat 10. The configuration with the blocker 36', the coil spring 50' and the lockout hook 34' biases the lockout hook 34 toward a locking position (see FIG. 9A). In the alternative blocker 36' and the lockout hook 34' may each have separate biasing springs.

While specific embodiments of the invention have been shown and described in detail to illustrate the application of the principles of the invention, it will be understood that the invention may be embodied otherwise without departing from such principles.

The invention claimed is:

1. A vehicle seat comprising:
a track arrangement comprising a fixed track part and a moveable track part, the track arrangement having a lockable track range and a non-lockable track range, wherein in the lockable track range the fixed track part and the movable track part are locked and wherein in the non-lockable track range the fixed track part and the movable track part are not locked;
a seat base connected to the moveable track part for movement relative to the fixed track part and lockable relative to the fixed track part in one of a plurality of locking positions in the lockable range;
a lever recliner fitting comprising a pivoting joint between the seat base and a backrest;
wherein said backrest is pivotably connected to the seat base via the lever recliner fitting, the lever recliner fitting releasing the backrest from a set position and allowing pivoting movement of the backrest and adjustment of an inclination to a new set position of the backrest relative to the seat base;
a release element and pivot latch release releasing the backrest for pivoting into a forward position and releasing a locking state between the moveable track part and the fixed track part, allowing the seat base and the backrest in the forward position, to move forward to the non-lockable track range;
a lockout mechanism locking the backrest in the forward position, with the seat base in the non-lockable track range and releasing the backrest from the forward position upon moving the seat base rearward to the lockable range; and
a memory device indicating a set position of the moveable track part relative to the fixed track part in the lockable range, wherein a state of a cable device changes upon passing relative to the indicated set position for moving a blocker member from an open position to a blocking position upon moving toward a non-lockable range and for moving the blocker member from the blocking position to the open position upon returning from the non-lockable range.

2. A vehicle seat according to claim 1, wherein the lockout mechanism comprises:
a backrest lockout part;
a seat base lockout arrangement; and
a lockout actuator to change a connection state between backrest lockout part and the seat base lockout arrangement part depending upon whether the seat base and moveable track part are in the non-lockable track range or in the lockable track range.

3. A vehicle seat according to claim 2, wherein:
the backrest lockout part comprises a lockout catch member connected to the backrest;
the seat base lockout arrangement comprises:
a lockout hook connected to the seat base and pivotable between a locked position, with the lockout hook engaging the lockout catch member, and an unlocked position; and
a blocker member connected to the seat base and pivotable between a blocking position, with the blocker member engaging the lockout hook to maintain the lockout hook in the locked position and an open position, with the blocker member not engaging the lockout hook, whereby the lockout hook is moveable to the unlocked position.

4. A vehicle seat according to claim 3, wherein the seat base lockout arrangement further comprises:
a spring biasing the blocker member into a blocking position blocking the lockout hook from moving from the locked position to the unlocked position; and
a cable device for moving the blocker member from the blocking position to the open position, the cable device being responsive to a position of the seat base along the track arrangement, wherein the seat base and backrest are moveable into a non-lockable range and the cable device moves the blocker member from the blocking position to the open position as the seat base and backrest are moved out of the non-lockable range into the lockable range.

5. A vehicle seat according to claim 3, wherein the track arrangement comprises a comfort adjust actuator bar to release the moveable track part relative to the fixed track part for movement within the lockable track range and to set a seat set position of the moveable track part relative to the fixed track part within the lockable track range.

6. A vehicle seat according to claim 5, further comprising:
a track release mechanism configured to release the movable track from the lockable track range of the non-movable track part for movement of the movable track into the non-lockable range; and
a track release cable arrangement connected to the track release mechanism to actuate the track release mechanism to release the movable track from the lockable track range, wherein the track release cable arrangement is connected to the backrest such that forward rotation of the backrest pulls a cable of the cable arrangement to actuate the track release mechanism.

7. A vehicle seat according to claim 3, wherein the lockout hook is back driveable such that the lockout hook is moved, by movement of the lockout catch member upon upward movement of the backrest, out of the locked position to the unlocked position, with the blocker member in the open position.

8. A vehicle seat according to claim 1, wherein:
the backrest includes an annular latch pivot and a latch pivot opening receiving the annular latch pivot;
the pivot latch release includes a pivot release arrangement realizable fixing the backrest relative to the latch pivot;
the pivot release arrangement is actuated by the latch release element to release the backrest relative to the annular latch pivot;
the recliner fitting comprises a seat base fitting part fixed to the seat base and a backrest fitting part fixed to the annular latch pivot; and
upon the release of the backrest relative to the latch pivot for forward movement of the backrest, the seat base fitting part and the backrest fitting part remain in position defining a memory position, whereby upon return of the backrest and fixing the backrest relative to the latch pivot with the pivot release arrangement, the backrest is in the memory position.

9. A vehicle seat according to claim 8, wherein actuation of the release element releases the pivot release and the track arrangement to allow movement of the moveable track part into unlocked range.

10. A recliner arrangement for a vehicle seat having a backrest and a seat base connected to a vehicle floor by a track arrangement comprising a fixed track part and a moveable track part, the track arrangement having a lockable track range and a non-lockable track range, the recliner arrangement comprising:
- a seat base part;
- a backrest part;
- a lever recliner fitting comprising a pivoting joint between the seat base part and the backrest part with a seat base fitting part connected to the seat base part and a backrest fitting part connected to the backrest part, the seat base fitting part being pivotably connected to the backrest fitting part for setting an inclination of the backrest part relative to the seat base part in a set position and allowing pivoting movement of the backrest relative to the seat base to adjust an inclination to a new set position of the backrest part relative to the seat base part;
- a pivot latch release to allow the backrest fitting part and the seat base fitting part to rotate with respect to one another via a release mechanism;
- a lockout mechanism locking the backrest part in the forward position, with the seat base part in the non-lockable track range and releasing the backrest from the forward position with the seat base part in the lockable range; and
- the backrest part includes an annular latch pivot and a latch pivot opening receiving the latch pivot;
- the pivot latch release includes a pivot release arrangement realizable fixing the backrest part relative to the latch pivot;
- the pivot release arrangement is actuated by the latch release element to release the backrest part relative to the latch pivot;
- the seat base fitting part is fixed to the seat base part and the backrest fitting part is fixed to the latch pivot; and
- upon the release of the backrest part relative to the latch pivot for forward movement of the backrest part, the seat base fitting part and the backrest fitting part remain in position defining a memory position, whereby upon return of the backrest part and fixing the backrest part relative to the latch pivot with the pivot release arrangement, the backrest part is in the memory position.

11. A recliner arrangement according to claim 10, wherein the lockout mechanism comprises:
- a lockout catch member connected to one of the backrest part and the seat base part;
- a lockout hook connected to another of the backrest part and seat base part and pivotable between a locked position, with the lockout hook engaging the lockout catch member, and an unlocked position; and
- a blocker member connected to the seat base part and pivotable between a blocking position, with the blocker member engaging the lockout hook to maintain the lockout hook in the locked position, and an open position, with the blocker member not engaging the lockout hook, whereby the lockout hook assumes the unlocked position.

12. A recliner arrangement according to 11, further comprising:
- a spring biasing the blocker member into a blocking position blocking the lockout hook from moving from the locked position to the unlocked position;
- a cable device for moving the blocker member from the blocking position to the open position, the cable device being responsive to a position of the seat base part and backrest part along the track wherein the plurality of locking positions of the track are along the lockable range and the seat base part and backrest part are moveable into a non-lockable range and the cable device moves the blocker member from the blocking position to the open position as the seat base part and backrest part are moved out of the non-lockable range into the lockable range.

13. A recliner arrangement according 11, further comprising:
- a memory device indicating a set position of the moveable track part relative to the fixed track part in the lockable track range, wherein a state of the cable device changes upon passing relative to the indicated set position for moving the blocker member from the open position to the blocking position upon moving toward the non-lockable range and for moving the blocker member from the blocking position to the open position upon returning from the non-lockable range.

14. A recliner arrangement according to claim 11, wherein the lockout hook is back driveable such that the lockout hook is moved, by movement of the lockout catch member out of the locked position to the unlocked position, with the blocker member in the open position.

15. A recliner arrangement according to claim 11, wherein the lockout catch member is connected to the backrest part; and
the lockout hook is connected to the seat base part.

16. A recliner arrangement according to claim 11, wherein the blocker member and the lockout hook are unhanded for use on a left side or a right side of the vehicle seat.

* * * * *